United States Patent
Cai et al.

(10) Patent No.: US 9,519,501 B1
(45) Date of Patent: Dec. 13, 2016

(54) HARDWARE ASSISTED FLOW ACCELERATION AND L2 SMAC MANAGEMENT IN A HETEROGENEOUS DISTRIBUTED MULTI-TENANT VIRTUALIZED CLUSTERED SYSTEM

(71) Applicant: F5 Networks, Inc., Seattle, WA (US)

(72) Inventors: Hao Cai, Seattle, WA (US); Timothy S. Michels, Greenacres, WA (US); Paul I. Szabo, Shoreline, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/041,838

(22) Filed: Sep. 30, 2013

Related U.S. Application Data (60) Provisional application No. 61/707,960, filed on Sep. 30, 2012.

(51) Int. Cl.
*H04L 12/28* (2006.01)
*G06F 9/455* (2006.01)

(52) U.S. Cl.
CPC .................... *G06F 9/45558* (2013.01)

(58) Field of Classification Search
CPC ...................................................... H04L 45/00
USPC ........................................................ 370/389
See application file for complete search history.

(56) References Cited

U.S. PATENT DOCUMENTS

| | | |
|---|---|---|
| 4,993,030 A | 2/1991 | Krakauer et al. |
| 5,218,695 A | 6/1993 | Noveck et al. |
| 5,303,368 A | 4/1994 | Kotaki |
| 5,410,667 A | 4/1995 | Belsan et al. |
| 5,473,362 A | 12/1995 | Fitzgerald et al. |
| 5,511,177 A | 4/1996 | Kagimasa et al. |
| 5,537,585 A | 7/1996 | Blickenstaff et al. |

(Continued)

FOREIGN PATENT DOCUMENTS

| | | |
|---|---|---|
| CA | 2080530 A1 | 4/1994 |
| CA | 2512312 A1 | 7/2004 |

(Continued)

OTHER PUBLICATIONS

Ott D., et al., "A Mechanism for TCP-Friendly Transport-level Protocol Coordination", USENIX Annual Technical Conference, 2002, University of North Carolina at Chapel Hill, pp. 1-12.

(Continued)

*Primary Examiner* — Christopher R Crompton
(74) *Attorney, Agent, or Firm* — LeClairRyan, a Professional Corporation (57) ABSTRACT

A method performed by a hypervisor in a virtual network traffic management cluster, the method comprising: assigning a set of continuous available source media access control (SMAC) addresses to one or more virtual network traffic management devices in a network traffic management cluster, the one or more virtual network traffic management devices configured to handle connections for virtual guest instances; assigning a region of predetermined size in a SMAC-index mapping table to a corresponding virtual network traffic management device; wherein the assigned SMAC addresses and assigned region in the SMAC-index mapping table are accessible by the virtual guest instances; and maintaining SMAC-index pool allocation to virtual guest instances handled by corresponding virtual network traffic management devices.

18 Claims, 4 Drawing Sheets

(56) References Cited

U.S. PATENT DOCUMENTS

| | | |
|---|---|---|
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,623,490 A | 4/1997 | Richter et al. |
| 5,644,698 A | 7/1997 | Cannon |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Beri et al. |
| 5,995,491 A | 11/1999 | Richter et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,088,759 A | 7/2000 | Hasbun et al. |
| 6,104,706 A | 8/2000 | Richter et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,182,188 B1 | 1/2001 | Hasbun et al. |
| 6,202,071 B1 | 3/2001 | Keene |
| 6,202,156 B1 | 3/2001 | Kalajan |
| 6,223,206 B1 | 4/2001 | Dan et al. |
| 6,226,759 B1 | 5/2001 | Miller et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,311,290 B1 | 10/2001 | Hasbun et al. |
| 6,324,581 B1 | 11/2001 | Xu et al. |
| 6,329,985 B1 | 12/2001 | Tamer et al. |
| 6,339,785 B1 | 1/2002 | Feigenbaum |
| 6,349,343 B1 | 2/2002 | Foody et al. |
| 6,370,543 B2 | 4/2002 | Hoffert et al. |
| 6,374,263 B1 | 4/2002 | Bunger et al. |
| 6,374,336 B1 | 4/2002 | Peters et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,654,346 B1 | 11/2003 | Mahalingaiah et al. |
| 6,697,871 B1 | 2/2004 | Hansen |
| 6,704,755 B2 | 3/2004 | Midgley et al. |
| 6,721,794 B2 | 4/2004 | Taylor et al. |
| 6,728,265 B1 | 4/2004 | Yavatkar et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,757,706 B1 | 6/2004 | Dong et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,868,439 B2 | 3/2005 | Basu et al. |
| 6,871,245 B2 | 3/2005 | Bradley |
| 6,880,017 B1 | 4/2005 | Marce et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,999,912 B2 | 2/2006 | Loisey et al. |
| 7,003,533 B2 | 2/2006 | Noguchi et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,024,427 B2 | 4/2006 | Bobbitt et al. |
| 7,039,061 B2 | 5/2006 | Connor et al. |
| 7,051,112 B2 | 5/2006 | Dawson |
| 7,054,998 B2 | 5/2006 | Arnott et al. |
| 7,055,010 B2 | 5/2006 | Lin et al. |
| 7,072,917 B2 | 7/2006 | Wong et al. |
| 7,075,924 B2 | 7/2006 | Richter et al. |
| 7,089,286 B1 | 8/2006 | Malik |
| 7,111,115 B2 | 9/2006 | Peters et al. |
| 7,113,962 B1 | 9/2006 | Kee et al. |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |

(56) References Cited

U.S. PATENT DOCUMENTS

| | | |
|---|---|---|
| 7,171,469 B2 | 1/2007 | Ackaouy et al. |
| 7,173,929 B1 | 2/2007 | Testardi |
| 7,181,523 B2 | 2/2007 | Sim |
| 7,194,579 B2 | 3/2007 | Robinson et al. |
| 7,197,615 B2 | 3/2007 | Arakawa et al. |
| 7,206,863 B1 | 4/2007 | Oliveira et al. |
| 7,216,264 B1 | 5/2007 | Glade et al. |
| 7,234,074 B2 | 6/2007 | Cohn et al. |
| 7,236,491 B2 | 6/2007 | Tsao et al. |
| 7,237,076 B2 | 6/2007 | Nakano et al. |
| 7,243,089 B2 | 7/2007 | Becker-Szendy et al. |
| 7,243,094 B2 | 7/2007 | Tabellion et al. |
| 7,263,610 B2 | 8/2007 | Parker et al. |
| 7,269,168 B2 | 9/2007 | Roy et al. |
| 7,269,582 B2 | 9/2007 | Winter et al. |
| 7,272,613 B2 | 9/2007 | Sim et al. |
| 7,272,654 B2 | 9/2007 | Brendel |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,299,250 B2 | 11/2007 | Douceur et al. |
| 7,308,475 B1 | 12/2007 | Pruitt et al. |
| 7,330,486 B2 | 2/2008 | Ko et al. |
| 7,343,398 B1 | 3/2008 | Lownsbrough |
| 7,346,664 B2 | 3/2008 | Wong et al. |
| 7,383,288 B2 | 6/2008 | Miloushev |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,418,439 B2 | 8/2008 | Wong |
| 7,437,358 B2 | 10/2008 | Arrouye et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,496,367 B1 | 2/2009 | Ozturk et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,620,775 B1 | 11/2009 | Waxman |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,656,788 B2 | 2/2010 | Ma et al. |
| 7,680,836 B2 | 3/2010 | Anderson et al. |
| 7,685,126 B2 | 3/2010 | Patel et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kirnos et al. |
| 7,734,603 B1 | 6/2010 | McManis |
| 7,739,540 B2 | 6/2010 | Akutsu et al. |
| 7,743,031 B1 | 6/2010 | Cameron et al. |
| 7,743,035 B2 | 6/2010 | Chen et al. |
| 7,752,294 B2 | 7/2010 | Meyer et al. |
| 7,788,335 B2 | 8/2010 | Miloushev et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Mathew et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,889,734 B1 | 2/2011 | Hendel et al. |
| 7,900,002 B2 | 3/2011 | Lyon |
| 7,903,554 B1 | 3/2011 | Manur et al. |
| 7,904,466 B1 | 3/2011 | Valencia et al. |
| 7,913,053 B1 | 3/2011 | Newland |
| 7,937,421 B2 | 5/2011 | Mikesell et al. |
| 7,953,085 B2 | 5/2011 | Chang et al. |
| 7,953,701 B2 | 5/2011 | Okitsu et al. |
| 7,958,347 B1 | 6/2011 | Ferguson |
| 7,984,108 B2 | 7/2011 | Landis et al. |
| 8,005,953 B2 | 8/2011 | Miloushev et al. |
| 8,010,756 B1 | 8/2011 | Linde |
| 8,015,157 B2 | 9/2011 | Kamei et al. |
| 8,046,547 B1 | 10/2011 | Chatterjee et al. |
| 8,055,724 B2 | 11/2011 | Amegadzie et al. |
| 8,099,758 B2 | 1/2012 | Schaefer et al. |
| 8,103,622 B1 | 1/2012 | Karinta |
| 8,112,392 B1 | 2/2012 | Bunnell et al. |
| 8,117,244 B2 | 2/2012 | Marinov et al. |
| 8,171,124 B2 | 5/2012 | Kondamuru |
| 8,180,747 B2 | 5/2012 | Marinkovic et al. |
| 8,195,760 B2 | 6/2012 | Lacapra et al. |
| 8,204,860 B1 | 6/2012 | Ferguson et al. |
| 8,209,403 B2 | 6/2012 | Szabo et al. |
| 8,239,354 B2 | 8/2012 | Lacapra et al. |
| 8,271,751 B2 | 9/2012 | Hinrichs, Jr. |
| 8,302,100 B2 | 10/2012 | Deng et al. |
| 8,306,948 B2 | 11/2012 | Chou et al. |
| 8,326,798 B1 | 12/2012 | Driscoll et al. |
| 8,351,600 B2 | 1/2013 | Resch |
| 8,352,785 B1 | 1/2013 | Nicklin et al. |
| 8,392,372 B2 | 3/2013 | Ferguson et al. |
| 8,396,895 B2 | 3/2013 | Miloushev et al. |
| 8,397,059 B1 | 3/2013 | Ferguson |
| 8,400,919 B1 | 3/2013 | Amdahl et al. |
| 8,417,681 B1 | 4/2013 | Miloushev et al. |
| 8,417,746 B1 | 4/2013 | Gillett, Jr. et al. |
| 8,433,735 B2 | 4/2013 | Lacapra |
| 8,463,850 B1 | 6/2013 | McCann |
| 8,468,542 B2 | 6/2013 | Jacobson et al. |
| 8,548,953 B2 | 10/2013 | Wong et al. |
| 8,549,582 B1 | 10/2013 | Andrews et al. |
| 8,682,916 B2 | 3/2014 | Wong et al. |
| 8,725,692 B1 | 5/2014 | Natanzon et al. |
| 8,745,266 B2 | 6/2014 | Agarwal et al. |
| 8,954,492 B1 | 2/2015 | Lowell, Jr. |
| 9,020,912 B1 | 4/2015 | Majee et al. |
| 2001/0007560 A1 | 7/2001 | Masuda et al. |
| 2001/0047293 A1 | 11/2001 | Waller et al. |
| 2002/0035537 A1 | 3/2002 | Waller et al. |
| 2002/0059263 A1 | 5/2002 | Shima et al. |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0143909 A1 | 10/2002 | Botz et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0194342 A1 | 12/2002 | Lu et al. |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0065956 A1 | 4/2003 | Belapurkar et al. |
| 2003/0072318 A1 | 4/2003 | Lam et al. |
| 2003/0088671 A1 | 5/2003 | Klinker et al. |
| 2003/0128708 A1 | 7/2003 | Inoue et al. |
| 2003/0156586 A1 | 8/2003 | Lee et al. |
| 2003/0159072 A1 | 8/2003 | Belinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |

(56) References Cited

U.S. PATENT DOCUMENTS

| | | |
|---|---|---|
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0028043 A1 | 2/2004 | Maveli et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0093474 A1 | 5/2004 | Lin et al. |
| 2004/0098595 A1 | 5/2004 | Aupperle et al. |
| 2004/0133577 A1 | 7/2004 | Miloushev et al. |
| 2004/0133606 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0199547 A1 | 10/2004 | Winter et al. |
| 2004/0210731 A1 | 10/2004 | Chatterjee et al. |
| 2004/0213156 A1 | 10/2004 | Smallwood et al. |
| 2004/0236798 A1 | 11/2004 | Srinivasan et al. |
| 2005/0027862 A1 | 2/2005 | Nguyen et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0160243 A1 | 7/2005 | Lubbers et al. |
| 2005/0175013 A1 | 8/2005 | Le Pennec et al. |
| 2005/0187866 A1 | 8/2005 | Lee |
| 2005/0198501 A1 | 9/2005 | Andreev et al. |
| 2005/0213570 A1* | 9/2005 | Stacy et al. ............ 370/389 |
| 2005/0213587 A1 | 9/2005 | Cho et al. |
| 2005/0240756 A1 | 10/2005 | Mayer |
| 2005/0246393 A1 | 11/2005 | Coates et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0117048 A1 | 6/2006 | Thind et al. |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0179261 A1 | 8/2006 | Rajan |
| 2006/0184589 A1 | 8/2006 | Lees et al. |
| 2006/0200470 A1 | 9/2006 | Lacapra et al. |
| 2006/0206547 A1 | 9/2006 | Kulkarni et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0268932 A1 | 11/2006 | Singh et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0061441 A1 | 3/2007 | Landis et al. |
| 2007/0088702 A1 | 4/2007 | Fridella et al. |
| 2007/0128899 A1 | 6/2007 | Mayer |
| 2007/0136308 A1 | 6/2007 | Tsirigotis et al. |
| 2007/0139227 A1 | 6/2007 | Speirs et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0260830 A1 | 11/2007 | Faibish et al. |
| 2008/0046432 A1 | 2/2008 | Anderson et al. |
| 2008/0070575 A1 | 3/2008 | Claussen et al. |
| 2008/0114718 A1 | 5/2008 | Anderson et al. |
| 2008/0177994 A1 | 7/2008 | Mayer |
| 2008/0189468 A1 | 8/2008 | Schmidt et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0037500 A1 | 2/2009 | Kirshenbaum |
| 2009/0037975 A1 | 2/2009 | Ishikawa et al. |
| 2009/0041230 A1 | 2/2009 | Williams |
| 2009/0049260 A1 | 2/2009 | Upadhyayula et al. |
| 2009/0055507 A1 | 2/2009 | Oeda |
| 2009/0055607 A1 | 2/2009 | Schack et al. |
| 2009/0077097 A1 | 3/2009 | Lacapra |
| 2009/0077312 A1 | 3/2009 | Miura |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0161542 A1 | 6/2009 | Ho |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0240705 A1 | 9/2009 | Miloushev et al. |
| 2009/0240899 A1 | 9/2009 | Akagawa et al. |
| 2009/0265396 A1 | 10/2009 | Ram et al. |
| 2009/0313503 A1 | 12/2009 | Atluri et al. |
| 2010/0017643 A1 | 1/2010 | Baba et al. |
| 2010/0030777 A1 | 2/2010 | Panwar et al. |
| 2010/0061232 A1 | 3/2010 | Zhou et al. |
| 2010/0082542 A1 | 4/2010 | Feng et al. |
| 2010/0122248 A1 | 5/2010 | Robinson et al. |
| 2010/0199042 A1 | 8/2010 | Bates et al. |
| 2010/0205206 A1 | 8/2010 | Rabines et al. |
| 2010/0211547 A1 | 8/2010 | Kamei et al. |
| 2010/0325257 A1 | 12/2010 | Goel et al. |
| 2010/0325634 A1 | 12/2010 | Ichikawa et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0255537 A1 | 10/2011 | Ramasamy et al. |
| 2011/0296411 A1 | 12/2011 | Tang et al. |
| 2011/0320882 A1 | 12/2011 | Beaty et al. |
| 2012/0007239 A1 | 1/2012 | Kolics et al. |
| 2012/0042115 A1 | 2/2012 | Young |
| 2012/0078856 A1 | 3/2012 | Linde |
| 2012/0144229 A1 | 6/2012 | Nadolski |
| 2012/0150699 A1 | 6/2012 | Trapp et al. |
| 2012/0246637 A1 | 9/2012 | Kreeger et al. |
| 2013/0058225 A1 | 3/2013 | Casado et al. |
| 2013/0058252 A1 | 3/2013 | Casado et al. |
| 2014/0226666 A1* | 8/2014 | Narasimhan et al. ......... 370/392 |
| 2014/0372599 A1* | 12/2014 | Gutt et al. ............ 709/224 |

FOREIGN PATENT DOCUMENTS

| | | |
|---|---|---|
| EP | 0605088 A2 | 6/1994 |
| EP | 0605088 A3 | 2/1996 |
| EP | 0738970 | 10/1996 |
| JP | 63010250 | 1/1988 |
| JP | 6205006 A3 | 7/1994 |
| JP | 060332782 | 12/1994 |

(56) References Cited

FOREIGN PATENT DOCUMENTS

| JP | 8021924 B | 3/1996 |
|---|---|---|
| JP | 08328760 | 12/1996 |
| JP | 080339355 | 12/1996 |
| JP | 9016510 A | 1/1997 |
| JP | 11282741 A1 | 10/1999 |
| JP | 2000183935 A3 | 5/2000 |
| NZ | 566291 A | 12/2008 |
| WO | 0239696 A2 | 5/2002 |
| WO | 02056181 A2 | 7/2002 |
| WO | 2004061605 A2 | 7/2004 |
| WO | 2006091040 A1 | 8/2006 |
| WO | 2008130983 A1 | 10/2008 |
| WO | 2008147973 | 12/2008 |

OTHER PUBLICATIONS

Padmanabhan V., et al., "Using Predictive Prefetching to Improve World Wide Web Latency", SIGCOM, 1996, pp. 1-15.
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.
Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 1-4, vol. 33, No. 6.
Peterson, M., "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.
Response filed Jul. 6, 2007 to Office action dated Feb. 6, 2007 for related U.S. Appl. No. 10/336,784.
Response filed Mar. 20, 2008 to Final Office action dated Sep. 21, 2007 for related U.S. Appl. No. 10/336,784.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph-p. 868, col. 1, paragraph 1.
Rosen E., et al., "MPLS Label Stack Encoding", (RFC:3032) Network Working Group, Jan. 2001, pp. 1-22, (http://www.ietf.org/rfc/rfc3032.txt).
RSYNC, "Welcome to the RSYNC Web Pages," Retrieved from the Internet URL: http://samba.anu.edu.ut.rsync/. (Retrieved on Dec. 18, 2009).
Savage, et al., "AFRAID—A Frequently Redundant Array of Independent Disks," Jan. 22-26, 1996, pp. 1-13, USENIX Technical Conference, San Diego, California.
"Scaling Next Generation Web Infrastructure with Content-Intelligent Switching: White Paper," Apr. 2000, p. 1-9 Alteon Web Systems, Inc.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, in Proceedings of the Fifth NASA Goddard Space Flight Center Conference on Mass Storage Systems and Technologies, College Park, Maryland.
Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.
Stakutis, C., "Benefits of SAN-based file system sharing," Jul. 2000, pp. 1-4, InfoStor, www.infostor.com, last accessed on Dec. 30, 2002.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Tulloch, Mitch, "Microsoft Encyclopedia of Security," 2003, pp. 218, 300-301, Microsoft Press, Redmond, Washington.
Uesugi, H., English translation of office action dated May 26, 2008 in corresponding Japanese patent application No. 2002-556371.
"VERITAS SANPoint Foundation Suite(tm) and SANPoint Foundation Suite(tm) HA: New VERITAS Volume Management and File System Technology for Cluster Environments," Sep. 2001, VERITAS Software Corp.
Wang B., "Priority and Realtime Data Transfer Over the Best-Effort Internet", Dissertation Abstract, Sep. 2005, ScholarWorks@UMASS.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).
Wilkes, J., et al., "The HP AutoRAID Hierarchical Storage System," Feb. 1996, vol. 14, No. 1, ACM Transactions on Computer Systems.
"Windows Clustering Technologies—An Overview," Nov. 2001, Microsoft Corp., www.microsoft.com, last accessed on Dec. 30, 2012.
Zayas, E., "AFS-3 Programmer's Reference: Architectural Overview," Transarc Corp., version 1.0 of Sep. 2, 1991, doc. No. FS-00-D160.
"The AFS File System in Distributed Computing Environment," www.transarc.ibm.com/Library/whitepapers/AFS/afsoverview.html, last accessed on Dec. 20, 2002.
Aguilera, Marcos K. et al., "Improving recoverability in multi-tier storage systems," International Conference on Dependable Systems and Networks (DSN-2007), Jun. 2007, 10 pages, Edinburgh, Scotland.
Anderson, Darrell C. et al., "Interposed Request Routing for Scalable Network Storage," ACM Transactions on Computer Systems 20(1): (Feb. 2002), pp. 1-24.
Anonymous, "How DFS Works: Remote File Systems," Distributed File System (DFS) Technical Reference, retrieved from the Internet on Feb. 13, 2009:URL<:http://technetmicrosoft.com/en-us/library/cc782417WS.10,printer).aspx> (Mar. 2003).
Apple, Inc., "Mac OS X Tiger Keynote Intro. Part 2," Jun. 2004, www.youtube.com <http://www.youtube.com/watch?v=zSBJwEmRJbY>, p. 1.
Apple, Inc., "Tiger Developer Overview Series: Working with Spotlight," Nov. 23, 2004, www.apple.com using www.archive.org<http://web.archive.org/web/20041123005335/developer.apple.com/macosx/tiger/spotlight.html>, pp. 1-6.
"A Storage Architecture Guide," Second Edition, 2001, Auspex Systems, Inc., www.auspex.com, last accessed on Dec. 30, 2002.
Basney et al., "Credential Wallets: A Classification of Credential Repositories Highlighting MyProxy," TPRC 2003, Sep. 19-21, 2003, pp. 1-20.
Botzum, Keys, "Single Sign On—A Contrarian View," Open Group Website, <http://www.opengroup.org/security/topics.htm>, Aug. 6, 2001, pp. 1-8.
Novotny et al., "An Online Credential Repository for the Grid: MyProxy," 2001, pp. 1-8.
Cabrera et al., "Swift: A Storage Architecture for Large Objects," In Proceedings of the—Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.

(56) References Cited

OTHER PUBLICATIONS

Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Cavale, M. R., "Introducing Microsoft Cluster Service (MSCS) in the Windows Server 2003", Microsoft Corporation, Nov. 2002.
"CSA Persistent File System Technology," A White Paper, Jan. 1, 1999, p. 1-3, http://www.cosoa.com/white_papers/pfs.php, Colorado Software Architecture, Inc.
"Distributed File System: A Logical View of Physical Storage: White Paper," 1999, Microsoft Corp., www.microsoft.com, <http://www.eu.microsoft.com/TechNet/prodtechnol/windows2000serv/maintain/DFS nt95>, pp. 1-26, last accessed on Dec. 20, 2002.
English Translation of Notification of Reason(s) for Refusal for JP 2002-556371 (Dispatch Date: Jan. 22, 2007).
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1996, in proceedings of IEEE, Spring COMPCON, Santa Clara, CA, www.research.ibm.com, last accessed on Dec. 30, 2002.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
International Search Report for International Patent Application No. PCT/US2008/083117 (Jun. 23, 2009).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT/US02/00720, Jul. 8, 2004.
International Search Report from International Application No. PCT/US03/41202, mailed Sep. 15, 2005.
Karamanolis, C. et al., "An Architecture for Scalable and Manageable File Services," HPL-2001-173, Jul. 26, 2001. p. 1-114.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kimball, C.E. et al., "Automated Client-Side Integration of Distributed Application Servers," 13th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993. (http://www.ietf.org/rfc/rfc1510.txt?number=1510).
Korkuzas, V., Communication pursuant to Article 96(2) EPC dated Sep. 11, 2007 in corresponding European patent application No. 02718824.2-2201.
Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.
Long et al., "Swift/RAID: A distributed RAID System", Computing Systems, Summer 1994, vol. 7, pp. 333-359.
Modiano E., "Scheduling Algorithms for Message Transmission Over a Satellite Broadcast System," MIT Lincoln Laboratory Advanced Network Group, Nov. 1997, pp. 1-7.
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, Storage Networking Industry Association (SNIA), www.snia.org, last accessed on Mar. 26, 2001.
Debnath, Biplob et al., "ChunkStash: Speeding up inline Storage Deduplication using Flash Memory," USENIX Annual Technical Conference, 2010, pp. 1-16, usenix.org.
Oracle Secure Backup Reference Release 10.1, B14236-01, Mar. 2006, pp. 1-456.
Uesugi, H, Jul. 15, 2008 letter from Japanese associate reporting office action dated May 26, 2008 in corresponding Japanese patent application No. 2002-556371.
"Book Review—Building Storage Networks", Aug. 6, 2002, pp. 1-2, 2nd Edition, Retrieved from: http://www.enterprisestorageforum.com/sans/features/print/010556_1441201,00.html.

\* cited by examiner

HARDWARE ASSISTED FLOW ACCELERATION AND L2 SMAC MANAGEMENT IN A HETEROGENEOUS DISTRIBUTED MULTI-TENANT VIRTUALIZED CLUSTERED SYSTEM

STATEMENT OF RELATED APPLICATION

The present application claims the benefit of priority based on U.S. Provisional Patent Application Ser. No. 61/707,960, filed on Sep. 30, 2012, in the name of inventors Hao Cai, Tim Michels and Paul Szabo, entitled "Hardware Assisted Flow Acceleration and L2 SMAC Management in Heterogeneous Distributed Multi-Tenant Virtualized Clustered System", which is hereby incorporated by reference.

FIELD

The present disclosure relates to a hardware assisted flow acceleration and L2 SMAC management in a heterogeneous distributed multi-tenant virtualized clustered system.

BACKGROUND

Some existing network traffic management devices include a network interface comprising of a software-based control segment (CS) and a hardware-based data flow segment (DFS), whereby the network interface performs network address translation or transformations to facilitate packet transmission to clients and servers. Performing the transformations in the hardware DFS component is much faster than in the software CS component. Whenever a new flow is handled by the network traffic management device, the CS enters a new flow entry and translation information into a flow table accessible by the network interface.

More than one network traffic management device may be incorporated into a virtualized clustered system, in which the network traffic management devices in the cluster can operate as virtual network devices which share the same flow table. Each network traffic management device in the cluster is referred to as a 'guest'. For each guest, the network interface enters a flow entry, in which each flow entry may include source and destination L2 MAC and virtual MAC addresses, source IP, destination IP, source TCP port, destination TCP port, sequence number(s), VLAN, and/or a timestamp, for example. Accordingly, the amount of data that needs to be entered into the flow table is often more than 64 bytes, which is the per flow storage size of the flow table.

SUMMARY

In an aspect, a method performed by a hypervisor in a virtual network traffic management cluster is disclosed. The method comprises assigning a set of continuous available source media access control (SMAC) addresses to one or more virtual network traffic management devices in a network traffic management cluster, the one or more virtual network traffic management devices configured to handle connections for virtual guest instances. The method comprises assigning a region of predetermined size in a MAC table to a corresponding virtual network traffic management device; wherein the assigned SMAC addresses and assigned region in the MAC table are accessible by the virtual guest instances. The method comprises maintaining SMAC allocation to virtual guest instances handled by corresponding virtual network traffic management devices.

In an aspect, a processor readable medium having stored thereon instructions for performing a method is disclosed. The medium comprises processor executable code which when executed by at least one processor, causes the processor to assign a set of continuous available source media access control (SMAC) addresses to one or more virtual network traffic management devices in a network traffic management cluster, the one or more virtual network traffic management devices configured to handle connections for virtual guest instances. The processor is further configured to assign a region of predetermined size in a MAC table to a corresponding virtual network traffic management device; wherein the assigned SMAC addresses and assigned region in the MAC table are accessible by the virtual guest instances. The processor is further configured to maintain SMAC-allocation to virtual guest instances handled by corresponding virtual network traffic management devices.

In an aspect, a hypervisor of a network traffic management device comprises a network interface configured to communicate with one or more virtual network traffic management devices in a virtual network management cluster; a memory containing non-transitory machine readable medium comprising machine executable code having stored thereon instructions to be executed to perform a method. The hypervisor of the network traffic management device includes a processor coupled to the network interface and the memory. The processor or network interface is configured to execute the code to assign a set of continuous available source media access control (SMAC) addresses to one or more virtual network traffic management devices in a network traffic management cluster, the one or more virtual network traffic management devices configured to handle connections for virtual guest instances. The processor or network interface also assigns a region of predetermined size in a MAC table to a corresponding virtual network traffic management device; wherein the assigned SMAC addresses and assigned region in the MAC table are accessible by the virtual guest instances. The processor or network interface further maintains SMAC allocation to virtual guest instances handled by corresponding virtual network traffic management devices.

In one or more of the above aspects, a L2 and virtual MAC address for each virtual guest instance is stored in the one or more virtual network traffic management devices.

In one or more of the above aspects, at least a portion of the MAC table is assigned to a corresponding virtual cluster having the one or more virtual guest instances.

In one or more of the above aspects, at least a portion of the MAC table has a base boundary and a limit boundary, wherein storing of data associated with the virtual guest instance is performed from the limit boundary in a converging manner to the base boundary.

In one or more of the above aspects, the processor is further configured to receive a packet at the one or more virtual network traffic management devices; identify a flow signature from the received packet; perform a look up in a flow table using the identified flow signature; retrieve index information from the flow table; access the MAC table and retrieve a MAC address and transform information for the packet to establish a connection.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

In general, the system and method of the present disclosure reduces the size of the transformation data in the flow table by placing an index which is representative of the L2 and virtual MAC addresses required for each flow in the flow table. The L2 and virtual MAC addresses for each corresponding flow is stored in a separate MAC table, in which the index for the corresponding flow points to the corresponding L2 and virtual MAC addresses for that flow in the MAC table.

Figure 1:
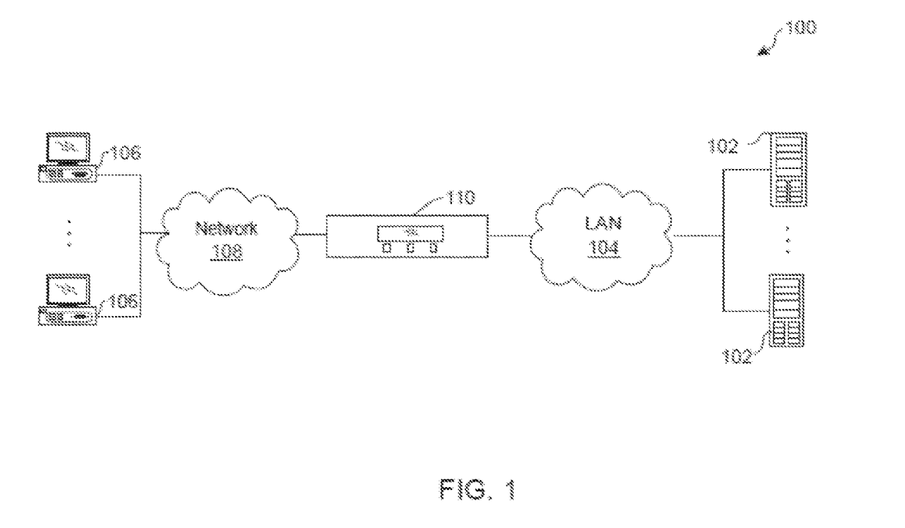
FIG. 1 is a diagram of an example system environment that includes a network traffic management device in accordance with an aspect of the present disclosure.

FIG. 1 is a diagram of an example system environment that includes a network traffic management device in accordance with an aspect of the present disclosure. The example system environment 100 includes one or more Web and/or non Web application servers 102 (referred generally as "servers"), one or more client devices 106 and one or more network traffic management devices 110, although the environment 100 can include other numbers and types of devices in other arrangements. The network traffic management device 110 is coupled to the servers 102 via local area network (LAN) 104 and client devices 106 via a wide area network 108. Generally, client device requests are sent over the network 108 to the servers 102 which are received or intercepted by the network traffic management device 110.

Client devices 106 comprise network computing devices capable of connecting to other network computing devices, such as network traffic management device 110 and/or servers 102. Such connections are performed over wired and/or wireless networks, such as network 108, to send and receive data, such as for Web-based requests, receiving server responses to requests and/or performing other tasks. Non-limiting and non-exhausting examples of such client devices 106 include personal computers (e.g., desktops, laptops), tablets, smart televisions, video game devices, mobile and/or smart phones and the like. In an example, client devices 106 can run one or more Web browsers that provide an interface for operators, such as human users, to interact with for making requests for resources to different web server-based applications and/or Web pages via the network 108, although other server resources may be requested by client devices.

The servers 102 comprise one or more server network devices or machines capable of operating one or more Web-based and/or non Web-based applications that may be accessed by other network devices (e.g. client devices, network traffic management devices) in the environment 100. The servers 102 can provide web objects and other data representing requested resources, such as particular Web page(s), image(s) of physical objects, JavaScript and any other objects, that are responsive to the client devices' requests. It should be noted that the servers 102 may perform other tasks and provide other types of resources. It should be noted that while only two servers 102 are shown in the environment 100 depicted in FIG. 1, other numbers and types of servers may be utilized in the environment 100. It is contemplated that one or more of the servers 102 may comprise a cluster of servers managed by one or more network traffic management devices 110. In one or more aspects, the servers 102 may be configured implement to execute any version of Microsoft® IIS server, RADIUS server, DIAMETER server and/or Apache® server, although other types of servers may be used.

Network 108 comprises a publicly accessible network, such as the Internet, which is connected to the servers 102, client devices 106, and network traffic management devices 110. However, it is contemplated that the network 108 may comprise other types of private and public networks that include other devices. Communications, such as requests from clients 106 and responses from servers 102, take place over the network 108 according to standard network protocols, such as the HTTP, UDP and/or TCP/IP protocols, as well as other protocols. As per TCP/IP protocols, requests from the requesting client devices 106 may be sent as one or more streams of data packets over network 108 to the network traffic management device 110 and/or the servers 102. Such protocols can be utilized by the client devices 106, network traffic management device 110 and the servers 102 to establish connections, send and receive data for existing connections, and the like.

Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols. Network devices such as client devices, 106, servers 102, network traffic management devices 110, routers, switches, hubs, gateways, bridges, cell towers and other intermediate network devices may act within and between LANs and other networks to enable messages and other data to be sent between network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. Thus, the network 108 is configured to handle any communication method by which data may travel between network devices.

LAN 104 comprises a private local area network that allows communications between the one or more network traffic management devices 110 and one or more servers 102 in the secured network. It is contemplated, however, that the LAN 104 may comprise other types of private and public networks with other devices. Networks, including local area networks, besides being understood by those skilled in the relevant arts, have already been generally described above in connection with network 108 and thus will not be described further.

As shown in the example environment 100 depicted in FIG. 1, the one or more network traffic management devices 110 is interposed between client devices 106 with which it communicates with via network 108 and servers 102 with which it communicates with via LAN 104. Generally, the network traffic management device 110 manages network communications, which may include one or more client requests and server responses, via the network 108 between the client devices 106 and one or more of the servers 102. In any case, the network traffic management device 110 may manage the network communications by performing several network traffic related functions involving the communications. Some functions include, but are not limited to, load balancing, access control, and validating HTTP requests using JavaScript code that are sent back to requesting client devices 106.

Figure 2A:
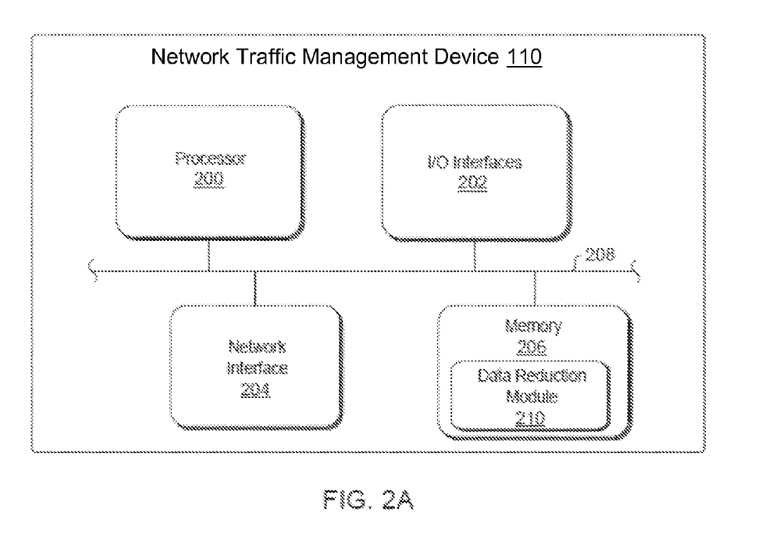
FIG. 2A is a block diagram of the network traffic management device in accordance with an aspect of the present disclosure.

FIG. 2A is a block diagram of the network traffic management device shown in FIG. 1 in accordance with an aspect of the present disclosure. As shown in FIG. 2A, the example network traffic management device 110 includes one or more device processors 200, one or more device I/O interfaces 202, one or more network interfaces 204, and one or more device memories 206, which are coupled together by one or more bus 208. It should be noted that the network traffic management device 110 can be configured to include other types and/or numbers of components and is thus not limited to the configuration shown in FIG. 2A.

Device processor 200 of the network traffic management device 110 comprises one or more microprocessors configured to execute computer/machine readable and executable instructions stored in the device memory 206. Such instructions, when executed by one or more processors 200, implement general and specific functions of the network traffic management device 110, including the inventive process described in more detail below. It is understood that the processor 200 may comprise other types and/or combinations of processors, such as digital signal processors, micro-controllers, application specific integrated circuits ("ASICS 214"), programmable logic devices ("PLDs"), field programmable logic devices ("FPLDs"), field programmable gate arrays ("FPGAs"), and the like. The processor 200 is programmed or configured according to the teachings as described and illustrated herein.

Device I/O interfaces 202 comprise one or more user input and output device interface mechanisms. The interface may include a computer keyboard, mouse, display device, and the corresponding physical ports and underlying supporting hardware and software to enable the network traffic management device 110 to communicate with other network devices in the environment 100. Such communications may include accepting user data input and providing user output, although other types and numbers of user input and output devices may be used. Additionally or alternatively, as will be described in connection with network interface 204 below, the network traffic management device 110 may communicate with the outside environment for certain types of operations (e.g. smart load balancing) via one or more network management ports.

Bus 208 may comprise one or more internal device component communication buses, links, bridges and supporting components, such as bus controllers and/or arbiters. The bus 208 enables the various components of the network traffic management device 110, such as the processor 200, device I/O interfaces 202, network interface 204, and device memory 206, to communicate with one another. However, it is contemplated that the bus 208 may enable one or more components of the network traffic management device 110 to communicate with one or more components in other network devices as well. Example buses include Hyper-Transport, PCI, PCI Express, InfiniBand, USB, Firewire, Serial ATA (SATA), SCS 214I, IDE and AGP buses. However, it is contemplated that other types and numbers of buses may be used, whereby the particular types and arrangement of buses will depend on the particular configuration of the network traffic management device 110.

Device memory 206 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information, which can be accessed by a computing or specially programmed network device, such as the network traffic management device 110.

Such storage media includes computer readable/processor-executable instructions, data structures, program modules, or other data, which may be obtained and/or executed by one or more processors, such as device processor 200. Such instructions, when executed, allow or cause the processor 200 to perform actions, including performing the inventive processes described below. The memory 206 may contain other instructions relating to the implementation and operation of an operating system for controlling the general operation and other tasks performed by the network traffic management device 110.

The network interface 204 performs the operations of routing, translating/transforming, and switching packets and comprises one or more mechanisms that enable the network traffic management device 110 to engage in network communications over the LAN 104 and the network 108 using one or more of a number of protocols, such as TCP/IP, HTTP, UDP, RADIUS and DNS. However, it is contemplated that the network interface 204 may be constructed for use with other communication protocols and types of networks. Network interface 204 is sometimes referred to as a transceiver, server array controller, transceiving device, or network interface card (NIC), which transmits and receives network data packets over one or more networks, such as the LAN 104 and the network 108. In an example, where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the interface 204 may include certain physical ports dedicated to receiving and/or transmitting certain types of network data, such as device management related data for configuring the network traffic management device 110 or client request/server response related data.

The network interface 204 also maintains flow entry and flow state information for flow of packets as well as dynamically selects operations on "flows" based on the content of the packets in the flow that the network traffic management device 110 handles. A flow is a sequence of packets that have the same flow signature. The flow signature is a tuple which includes information about the source and destination network devices which are to handle the packets in the flow. The flow exists for a finite period, wherein subsequent flows may have the same flow signature as a previously handled flow. The network interface 204 is configured to leverage the flow signatures of previously handled flows to more efficiently handle new flows having the same flow signatures, as will be discussed in more detail below.

Figure 2B:
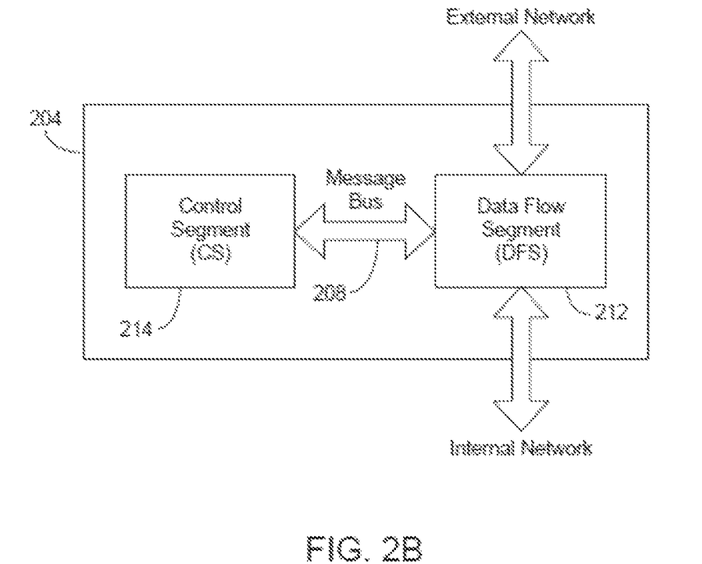
FIG. 2B is a block diagram of the network interface of the network traffic management device in accordance with an aspect of the present disclosure.

FIG. 2B is a block diagram of the network interface in accordance with an aspect of the present disclosure. As shown in FIG. 2B, the network interface 204 includes a Data Flow Segment (DFS) 212 and at least one Control Segment (CS) 214. Although the network interface 204 is shown as two partitions, it is understood and appreciated that the segmented blocks may be incorporated into one or more separate blocks including, but not limited to, two segments in the same chassis.

The DFS 212 includes the hardware-optimized portion whereas the CS 214 includes the software-optimized portion of the network interface 204. The DFS 212 performs most of the repetitive tasks including statistics gathering and per-packet policy enforcement (e.g. packet switching). The DFS 212 may also perform tasks such as that of a router, a switch, or a routing switch. The CS 214 determines the translation to be performed on each new flow and performs high-level control functions and per-flow policy enforcement.

As mentioned above, the network interface 204 (and the combined operation of the DFS 212 and CS 214) performs network address translation (NAT) functions on flows between client devices in external networks and servers in internal secure or non-secure networks. Translation or transformation information may include a set of rules that provide instructions on how parts of a packet are to be rewritten, and the values that those parts will be rewritten to. Packets can be received by the DFS 212 from both internal and external networks. After the packets are received, the DFS 212 categorizes the packets into flows, analyzes the flow signature, and looks up the transformation data for that flow signature in a table (or another suitable data construct). If the table does not have an entry for the particular flow signature, the DFS 212 sends a query to the CS 214 over the message bus for instructions. The CS 214 accesses a flow table to see whether there is an already existing flow signature that matches the queried flow signature. If no match is found, the CS 214 makes a new entry in the table for the new flow signature and replies to the DFS 212 with translation instructions on handling the new flow. The DFS 212 makes a new entry in its table for the new flow signature and then routes, switches or otherwise directs the flow based on the translation information for that particular flow signature.

As mentioned above, a plurality of network traffic management devices 110 can be combined as a network traffic management cluster, wherein the multiple network traffic management devices 110 share resources to handle network traffic. Additionally, the network traffic management devices in a particular cluster may be configured to act as virtual devices, thereby allowing multiple instances of software to run on one physical network traffic management device.

In the virtualized network traffic management cluster (also termed "virtual cluster"), the DFS will be virtualized in which one or more virtual network interfaces will handle the functions of the network interface 204 described above for virtual services. Additionally, considering that the virtual network interfaces are virtual in nature, they do not communicate with one another. The virtual network interfaces (referred to as 'guests') will require a virtual MAC address from the DFS 212.

When a guest first communicates with the network interface 204 (such as during start up), each of the guest's virtual network devices is provided an L2 MAC address. Additionally, each virtual guest can allocate one or more virtual MAC addresses not assigned by the host (referred to as virtual masquerader MAC addresses) that the virtual guest can configure and associate with a traffic service group.

The DFS component 212 of the network interface 204 maintains a MAC table for a cluster, in which the MAC table is separate from the flow table described above. DFS component 212 is configured to store the L2 and virtual MAC addresses for each guest in the cluster. In an aspect, the MAC table is able to store the L2 and virtual MAC addresses for up to 32 guest devices, although a greater or lesser number is contemplated. In particular, each guest is given a dedicated portion of the MAC table.

At provisioning or start up, each virtual cluster is assigned a set of continuous SMAC(s) starting with a base. A region of a MAC table is also assigned to the corresponding virtual cluster. Multiple sets of SMAC(s) can also be used with different bases. The DFS 212 maintains SMAC/index allocation info for each guest cluster. The assigned region of MAC table is managed by the corresponding guests, although the DFS 212 performs access boundary check and lookup verification/transformation. Additionally, requests from virtual network traffic management devices for additional SMAC addresses can be serviced by allocating additional space in the MAC table for, and assigning to the corresponding virtual network traffic management device, the additional SMAC addresses.

Each guest's portion in the MAC table is designated to have storage boundaries of a base boundary and a limit boundary. In an aspect, L2 MAC address entries are stored beginning at the base boundary and take up storage space toward the limit boundary, wherein the portion is effectively cut in half to accommodate L2 MAC addresses and virtual MAC addresses. Similarly, virtual MAC address entries are stored beginning at the limit boundary and take up storage space toward the base boundary. As a result, the storage area of the guest device's portion gets filled in a converging manner.

Figure 3:
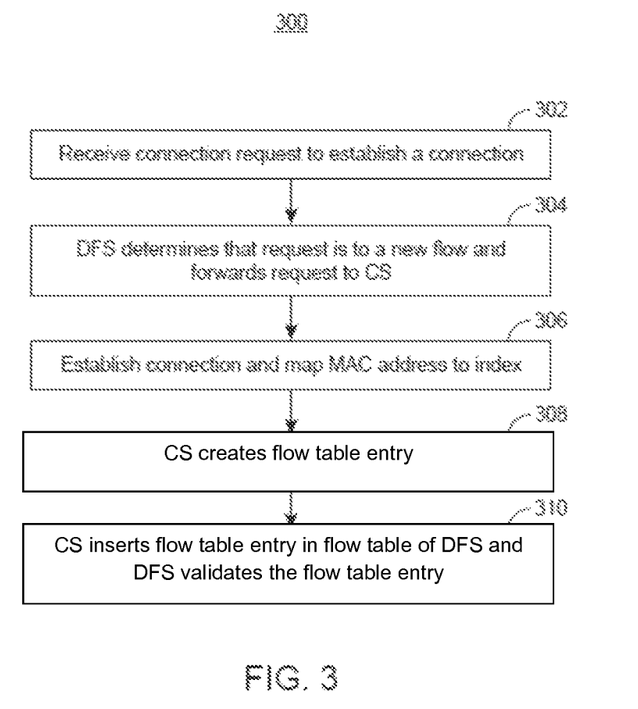
FIG. 3 illustrates a flow chart describing the process performed in accordance with an aspect of the present disclosure.

FIG. 3 illustrates a flow chart describing the process performed by the application module for a new flow in accordance with an aspect of the present disclosure. As shown in FIG. 3, the network traffic management device 110 receives a request from a guest network traffic management device to establish a connection for a flow (Block 302). This request is initially handled by the DFS 212 of the network traffic management device 110. In the example process show in FIG. 3, the DFS 212 determines that the request is for a new flow connection. Accordingly, the DFS 212 forwards the request to the CS 214 for handling (Block 304). The CS 214 thereafter establishes the connection and generates a mapping of the MAC address to an index in the MAC table (Block 306). The CS 214 also creates a flow table entry in the flow table, wherein the flow table entry contains the index (Block 308). The CS then inserts the flow table entry into the flow table of the DFS 212 and the DFS validates the entry (Block 310).

Figure 4:
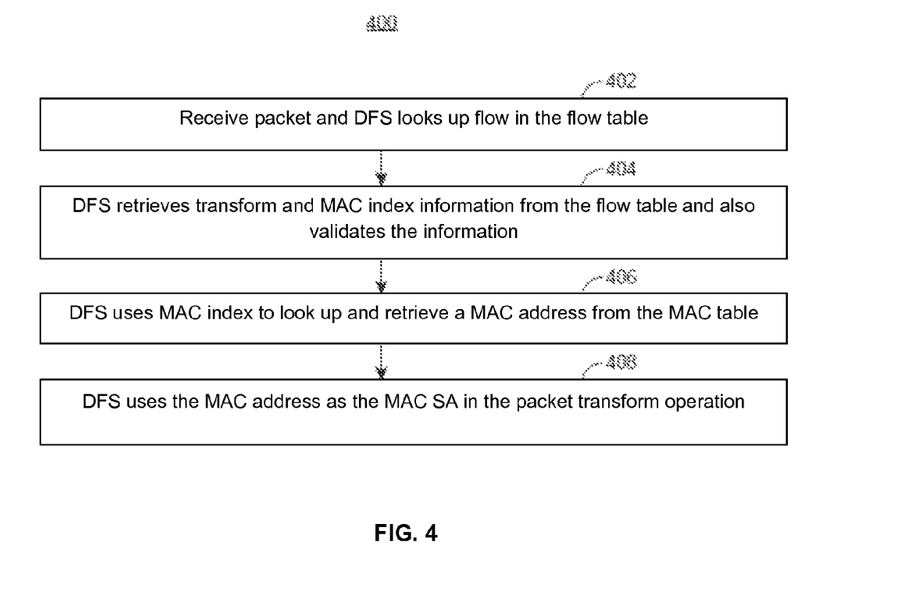
FIG. 4 illustrates a flow chart describing the process performed in accordance with an aspect of the present disclosure.

FIG. 4 illustrates a flow chart describing the process performed by the application module for an existing flow in accordance with an aspect of the present disclosure. As shown in FIG. 4, the packet is received by the network traffic management device 110, whereby the DFS 212 analyzes the packet to identify the flow signature for the connection to allow the DFS 212 to look up the flow signature in the flow table (Block 402). Once the DFS 212 locates the flow signature in the flow table, the DFS 212 retrieves the corresponding transform information as well as the MAC index information from the flow table and validates the retrieved information (Block 404). The DFS 212 then accesses the MAC table and uses the MAC index to look up and retrieve a MAC address (Block 406), whereby the DFS utilizes the MAC address as the MAC source address in the packet transform operation (Block 408).

In this example, the traffic management device 110 further enforces use of a respective one of the SMAC addresses assigned to the virtual network traffic management devices. Enforcement can include dropping the packet, preventing packets returning on the flow associated with the corresponding MAC address from returning to the virtual traffic management device, or logging information about the problem in the hypervisor, for example, although other methods of enforcing use of only assigned addresses by each of the virtual traffic management devices can also be used.

Accordingly, when a packet is received by a network traffic management device in which the packet is associated with a new connection, the DFS component of the network traffic management device forwards the new connection request to the CS component of the network traffic management device. The CS component then establishes the connection, creates a mapping of the MAC addresses for that to an index in a table (which may already be populated) in the DFS component. The CS creates a corresponding flow entry in the flow table, in which the flow entry includes the requisite data for the connection and index for the new connection. The CFS component then inserts the flow into the flow table in the DFS 212 component. When a packet is received by the network traffic management device in which the packet is associated with an established connection, the DFS 212 component will look up the flow entry in the flow table (based on a key generated based on characteristics 214 of the packet) to retrieve transform and MAC index information, look up and retrieve the MAC address in the MAC table based on the retrieved MAC index, and transform the packet using the retrieved MAC address as the MAC source address.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed system and/or processes to any order except as may be specified in the claims. Accordingly, the system and method is limited only by the following claims and equivalents thereto.

What is claimed is:

1. A method for facilitating network address translation in a virtualized network traffic management cluster, executable by one or more traffic management devices with at least one processor executing the method, the method comprising steps to:
   assign, by a first processor on the one or more network traffic management devices, a set of continuous available source media access control (SMAC) addresses stored in a region of a MAC table to a network traffic management cluster comprising one or more virtual network traffic management devices;
   establish, by a second processor on the one or more network traffic management devices, a connection in response to a request from one of the virtual network traffic management devices that received a packet associated with a new flow;
   insert, by a third processor on the one or more network traffic management devices, a flow table entry comprising an index to the MAC table into a flow table in a hardware-based data flow segment (DFS), wherein the flow table entry can be identified based on a key generated from a flow signature of the packet and the index corresponds to a MAC table entry in the MAC table storing one of the SMAC addresses corresponding to the one of the virtual network traffic management devices; and
   transform, by a fourth processor on the one or more network traffic management devices, the packet associated with the connection using the one of the SMAC addresses as a source address of the received packet and send the received packet to a destination network device.

2. The method of claim 1, further comprising employing at least one of the first, second, third, or fourth processors on the one or more network traffic management devices to:
   generate the key based on the flow signature of another received packet;
   retrieve the flow table entry using the key and the MAC table entry using the index retrieved from the flow table entry; and
   transform the another received packet using the MAC address.

3. The method of claim 1, wherein the at least a portion of the MAC table has a base boundary and a limit boundary, wherein storing of data associated with the virtual network traffic management devices is performed from the limit boundary in a converging manner to the base boundary.

4. The method of claim 1, further comprising employing at least one of the first, second, third, or fourth processors on the one or more network traffic management devices to enforce use of the set of SMAC addresses assigned to the virtual network traffic management devices.

5. The method of claim 1, further comprising employing at least one of the first, second, third, or fourth processors on the one or more network traffic management devices to:
   receive a request from another one of the virtual network traffic management devices for one or more additional SMAC addresses; and
   allocate additional space in the MAC table for, and assign to the another one of the virtual network traffic management devices, the one or more additional SMAC addresses.

6. The method as set forth in claim 1, wherein the first processor, the second processor, the third, and the fourth processor are the same processor.

7. The method as set forth in claim 1, wherein two or more of the first processor, the second processor, the third processor, or the fourth processor are on a same one of the network traffic management devices.

8. A non-transitory computer readable medium having stored thereon instructions for facilitating network address translation in a virtualized, comprising executable code which when executed by one or more processors causes the processors to perform steps comprising:
   assigning a set of continuous available source media access control (SMAC) addresses stored in a region of a MAC table to a network traffic management cluster comprising one or more virtual network traffic management devices;

establishing a connection in response to a request from one of the virtual network traffic management devices that received a packet associated with a new flow;

inserting a flow table entry comprising an index to the MAC table into a flow table in a hardware-based data flow segment (DFS), wherein the flow table entry can be identified based on a key generated from a flow signature of the packet and the index corresponds to a MAC table entry in the MAC table storing one of the SMAC addresses corresponding to the one of the virtual network traffic management devices; and transforming the packet associated with the connection using the one of the SMAC addresses as a source address of the received packet and send the received packet to a destination network device.

9. The non-transitory computer readable medium of claim 8, further having stored thereon executable code which when executed by the processors further causes the processors to perform one or more additional steps comprising:

generating the key based on the flow signature of another received packet;

retrieving the flow table entry using the key and the MAC table entry using the index retrieved from the flow table entry; and transforming the another received packet using the MAC address.

10. The non-transitory computer readable medium of claim 8, wherein the at least a portion of the MAC table has a base boundary and a limit boundary, wherein storing of data associated with the virtual network traffic management devices is performed from the limit boundary in a converging manner to the base boundary.

11. The non-transitory computer readable medium of claim 8, further having stored thereon executable code which when executed by the processors further causes the processors to perform one or more additional steps comprising enforcing use of the set of SMAC addresses assigned to the virtual network traffic management devices.

12. The non-transitory computer readable medium of claim 8, further having stored thereon executable code which when executed by the processors further causes the processors to perform one or more additional steps comprising:

receiving a request from another one of the virtual network traffic management devices for one or more additional SMAC addresses; and allocating additional space in the MAC table for, and assign to the another one of the virtual network traffic management devices, the one or more additional SMAC addresses.

13. One or more network traffic management devices comprising:

memory comprising programmed instructions stored in the memory; and one or more processor configured to be capable of executing the programmed instructions stored in the memory to:

assign a set of continuous available source media access control (SMAC) addresses stored in a region of a MAC table to a network traffic management cluster comprising one or more virtual network traffic management devices;

establish a connection in response to a request from one of the virtual network traffic management devices that received a packet associated with a new flow;

insert a flow table entry comprising an index to the MAC table into a flow table in a hardware-based data flow segment (DFS), wherein the flow table entry can be identified based on a key generated from a flow signature of the packet and the index corresponds to a MAC table entry in the MAC table storing one of the SMAC addresses corresponding to the one of the virtual network traffic management devices; and transform the packet associated with the connection using the one of the SMAC addresses as a source address of the received packet and send the received packet to a destination network device.

14. The one or more network traffic management devices of claim 13, wherein the one or more processor are further configured to be capable of executing the programmed instructions stored in the memory to:

generate the key based on the flow signature of another received packet;

retrieve the flow table entry using the key and the MAC table entry using the index retrieved from the flow table entry; and transform the another received packet using the MAC address.

15. The one or more network traffic management devices of claim 13, wherein the at least a portion of the MAC table has a base boundary and a limit boundary, wherein storing of data associated with the virtual network traffic management devices is performed from the limit boundary in a converging manner to the base boundary.

16. The one or more network traffic management devices of claim 13, wherein the one or more processor are further configured to be capable of executing the programmed instructions stored in the memory to enforce use of the set of SMAC addresses assigned to the virtual network traffic management devices.

17. The one or more network traffic management devices of claim 13, wherein the one or more processor are further configured to be capable of executing the programmed instructions stored in the memory to:

receive a request from another one of the virtual network traffic management devices for one or more additional SMAC addresses; and allocate additional space in the MAC table for, and assign to the another one of the virtual network traffic management devices, the one or more additional SMAC addresses.

18. A method for facilitating network address translation in a virtualized network traffic management cluster, the method comprising:

assigning, by a network traffic management device, a set of continuous available source media access control (SMAC) addresses stored in a region of a MAC table to a network traffic management cluster comprising one or more virtual network traffic management devices;

establishing, by the network traffic management device, a connection in response to a request from one of the virtual network traffic management devices that received a packet associated with a new flow;

inserting, by the network traffic management device, a flow table entry comprising an index to the MAC table into a flow table in a hardware-based data flow segment (DFS), wherein the flow table entry can be identified based on a key generated from a flow signature of the packet and the index corresponds to a MAC table entry in the MAC table storing one of the SMAC addresses corresponding to the one of the virtual network traffic management devices; and transforming, by the network traffic management device, the packet associated with the connection using the one of the SMAC addresses as a source address of the received packet and send the received packet to a destination network device.

* * * * *